United States Patent [19]

Kanayama et al.

[11] 4,370,684
[45] Jan. 25, 1983

[54] TAPE RECORDER WITH AUTOMATIC TAPE END STOPPING AND ALARM GENERATION

[75] Inventors: Katsumi Kanayama; Kazuyasu Motoyama; Kenzi Furuta, all of Hachioji, Japan

[73] Assignee: Olympus Optical Co., Ltd., Tokyo, Japan

[21] Appl. No.: 148,503

[22] Filed: May 9, 1980

[30] Foreign Application Priority Data

May 15, 1979 [JP] Japan .......................... 54-64439[U]

[51] Int. Cl.$^3$ ..................... G11B 19/06; G11B 15/48
[52] U.S. Cl. ................................ 360/74.2; 360/72.3
[58] Field of Search .................. 360/74.2, 74.1, 74.3, 360/73, 72.2, 72.3; 235/92 MP; 242/75.51, 75.52, 186; 318/311–313

[56] References Cited

U.S. PATENT DOCUMENTS

| 4,085,890 | 4/1978 | Kimura et al. | 235/92 MP |
| 4,157,575 | 6/1979 | Satoh | 360/74.1 |
| 4,172,231 | 10/1979 | d'Alayer de Costemore d'Arc et al. | 360/72.3 |
| 4,215,378 | 7/1980 | Sato et al. | 360/74.1 |
| 4,267,564 | 5/1981 | Flores | 360/74.1 |

FOREIGN PATENT DOCUMENTS

| 54-113305 | 9/1979 | Japan | 360/74.2 |
| 54-113306 | 9/1979 | Japan | 360/74.2 |

Primary Examiner—Alfred H. Eddleman
Attorney, Agent, or Firm—Frishauf, Holtz, Goodman and Woodward

[57] ABSTRACT

In a tape recorder, which has a circuit for producing pulses according to the running of a tape, there is provided an electronic counter circuit having a counter for counting pulses produced from that circuit and a display section for displaying the count. The electronic counter circuit includes a missing-pulse detector for detecting the pulse interval of the output pulse signal of the pulse generating circuit and producing a detection signal when the detected pulse interval exceeds a predetermined interval, a circuit for producing an alarm for a predetermined period of time according to the output signal of the missing-pulse detector, and a circuit for supplying a rotation stop signal to a motor of the tape recorder according to the output signal of the missing-pulse detector.

2 Claims, 8 Drawing Figures

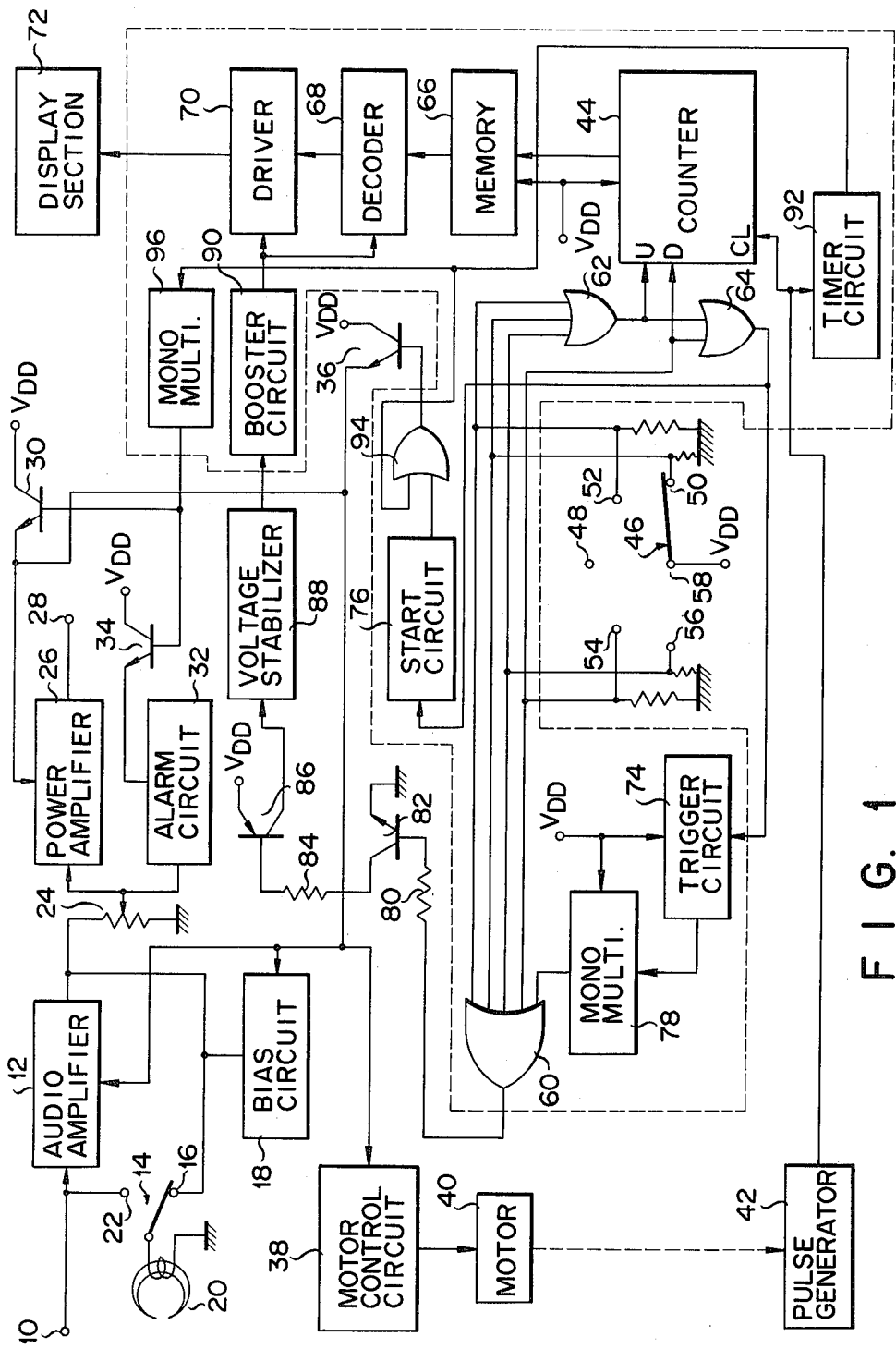
F I G. 1

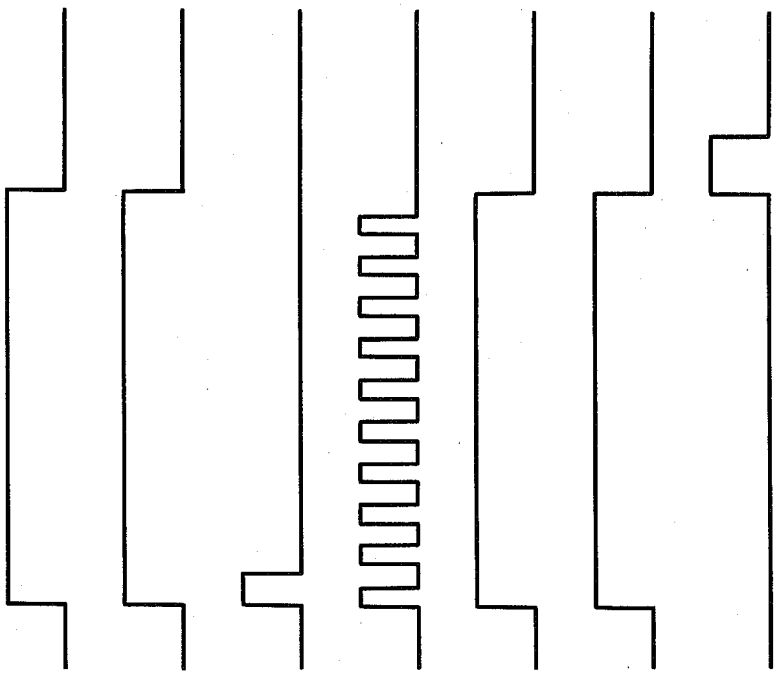

TAPE RECORDER WITH AUTOMATIC TAPE END STOPPING AND ALARM GENERATION

BACKGROUND OF THE INVENTION

This invention relates to a tape recorder having an electronic counter circuit used for end of tape detection, and an alarm generation means.

Tape recorders are usually provided with a tape counter for indicating the amount of running of a tape. Hitherto, a mechanical counter which has number gears rotated in an interlocked relation to the rotation of a reel shaft and displays the amount of running of the tape with a corresponding number has been used. Recently, an electronic counter circuit which comprises a pulse generator for producing a pulse signal in accordance with the rotation of a reel shaft to count these pulses so that the count thereof indicates the amount of running of the tape is in use. The electronic counter circuit can effect various controls with its count value. For example, it can automatically stop the running of the tape when the tape is run up to a predetermined count value at the time of the fast forward or rewind operation. It can also automatically stop the running of the tape when the tape is completely wound on one of the reels, that is, when a tape end state is brought about. In the electronic counter circuit, a high power is consumed in a display section, so that it is desirable to disconnect the electronic counter circuit from the power source when the running of the tape is stopped. However, even at the time of switching of operation modes, for instance from a playback mode over to a rewind mode, the running of the tape is temporarily stopped. At this time, the counter is reset, and the display on the display section disappears. Therefore, the count value corresponds to the amount of running of the tape from a position thereof assumed each time when the running of the tape is stopped. In other words, once the running of the tape is stopped, a value corresponding to the amount of running of the tape from the initial position thereof, i.e., the tape position when the tape is entirely wound on one of the reels, can no longer be obtained. This means that such a control as stopping the running of the tape at a desired count value is interfered with. Accordingly, it is in practice to control the power supply to the display section by providing a switch for the display section separately from the operation switches for the tape recorder. In this case, however, the mechanism is complicated, and also it is likely that the display disappears with erroneous operation of the switch.

It is usually adopted in tape recorders that when the tape is run to the end, the power source for the tape recorder is automatically disconnected to stop the running of the tape. At this time, it is desired to provide an alarm of some sort. In the playback, when the power source is automatically disconnected, the playback sound ceases so that the operator can recognize the tape end state. In the recording mode, however, the operator has to perceive the tape end state by sight unless the recording signal is monitored or an alarm is given at the time when the tape end state is brought about. In this case, if the recording mode is continued without noticing the tape end state, the subsequent recording fails, or in order not to miss the occurrence of the tape end state, extra attention has to be paid.

SUMMARY OF THE INVENTION

An object of the invention is to provide a tape recorder having an electronic counter circuit, which has a counter for counting pulses produced from a pulse generator and which produces an alarm signal for a predetermined period of time when the pulse generator ceases to produce pulses.

According to the invention, a tape recorder in which an audio signal is supplied to a magnetic head through an audio amplifier with an output signal from a bias circuit at the time of a recording operation, and an output signal from the magnetic head is supplied to a loudspeaker through the audio amplifier and a power amplifier at the time of a reproducing operation, comprises: means for running a magnetic tape; pulse generating means for generating a pulse signal representing a distance for which the tape travels, the pulse signal comprising spaced apart pulses; counting means coupled to the pulse generating means for counting pulses of the pulse signal from the pulse signal generating means; detecting means coupled to the pulse generating means for producing a detection signal, the level of which changes when the pulse interval between the pulses of the pulse signal exceeds a predetermined interval; and alarm means for producing an alarm through the power amplifier to the loudspeaker. Further provided is first power supplying means coupled to the detecting means for supplying power to the auto amplifier, to the bias circuit, to the tape running means and to the power amplifier until the detecting means generates a detection signal at which time the first power supplying means is rendered off to stop supplying said power; and second power supplying means coupled to the detecting means for supplying power to the power amplifier and to the alarm means only for a predetermined period of time after the detection signal is generated.

BRIEF DESCRIPTION OF THE DRAWINGS

FIG. 1 is a schematic representation of an embodiment of the electronic circuit according to the invention applied to a tape recorder; and FIGS. 2A to 2G form a time chart showing signal waveforms appearing in various parts of the circuit of FIG. 1 for illustrating the operation thereof.

DESCRIPTION OF THE PREFERRED EMBODIMENT

Referring now to FIG. 1, an audio signal from a microphone, tuner, etc. (not shown) is supplied to an input terminal 10. The input terminal 10 is connected through an audio amplifier 12 to a recording terminal 16 of a recording/playback select switch 14. The output signal of a bias circuit 18 is coupled to the recording terminal 16 of the switch 14. The switch 14 has its movable contact connected to a magnetic head 20, and its playback terminal 22 is connected through an audio amplifier 12 to a potentiometer 24. The magnetic head 20 is brought into contact with a tape when a switch button (not shown) of the tape recorder is operated. The output signal from the potentiometer 24 is coupled to an output terminal 28 through a power amplifier 26. The signal appearing at the output terminal 28 is converted to sound by a loudspeaker (not shown). A power supply terminal $V_{DD}$ to which a DC voltage is supplied, is connected to the collector of an NPN transistor 30, and the emitter thereof is connected to a power supply terminal of the power amplifier 26. The output signal from an alarm circuit 32, which produces an alarm signal, is also coupled to the output terminal 28 through the power amplifier 26. The power supply terminal $V_{DD}$ is also connected through the collector-emitter path of an NPN transistor 34 to a power supply terminal of the alarm circuit 32. The power supply terminal $V_{DD}$ is further connected to the collector of an NPN transistor 36. The emitter of the transistor 36 is connected to the emitter of the transistor 30 and also to power supply terminals of the audio amplifier 12, the bias circuit 18 and a motor control circuit 38. The motor control circuit 38 supplies a control signal representing the speed and direction of rotation corresponding to an operated switch button (not shown) to a motor 40. The output signal of a pulse generator 42, which is energized according to the rotation of the motor 40, is supplied to a clock input terminal CL of an up/down counter 44. As the pulse generator 42 a reed switch may be used. In this case, a disc having a peripheral permanent magnetic arrangement may be mounted on a reel shaft of the tape recorder, and the reed switch may be disposed in the neighborhood of the reel shaft. With this arrangement, with the rotation of the reel shaft the reed switch may be on-off operated to produce pulses. Alternatively, a light reflecting section may be provided on a portion of the outer periphery of the reel shaft and combined with a light-emitting element and a light-receiving element to optically produce pulses. In general, whatever means may be used as the pulse generator 42 so long as it produces pulses according to the rotation of the reel shaft, i.e., the running of the tape.

Designated at 46 is a mode switch, which is switched with the operation of a switch button (not shown) of the tape recorder and controls the switching of the recording/playback select switch 14, contact of the magnetic head 20 with the tape and selection of the control signal produced from the motor control circuit 38. It has five fixed contacts 48, 50, 52, 54 and 56, and its movable contact 58 is connected to the power supply terminal $V_{DD}$. The movable contact 58 of the mode switch 46 is connected to the fixed contacts 48, 50, 52 and 54 thereof respectively at the time of stop, recording, playback, rewind and fast forward modes of the tape recorder. The stop terminal 48 is floated, and the recording terminal 50, playback terminal 52, rewind terminal 54 and fast forward terminal 56 are connected to respective input terminals of an OR gate 60. The recording terminal 50, playback terminal 52 and fast forward terminal 56 are also connected to respective input terminals of an OR gate 62. The rewind terminal 54 is also connected to a down-count terminal D of the up/down counter 44 and to one of the input terminals of an OR gate 64. The output terminal of the OR gate 62 is connected to an up-count terminal U of the up/down counter 44 and also to the other input terminal of the OR gate 64. The count output of the counter 44 is supplied to a memory 66, and the output thereof is supplied to a display section 72 through a decoder 68 and a driver 70. The decoder 68 serves to convert the output of the counter 44, which is a binary signal, into a segment signal for display. The counter 44 and memory 66 are connected to the power supply terminal $V_{DD}$. The output signal of the OR gate 64 is coupled to a trigger circuit 74 and also to a start circuit 76 which is constituted by a monostable multivibrator. The output signal of the trigger circuit 74 is coupled to a monostable multivibrator 78. The trigger circuit 74 and monostable multivibrator 78 are connected to the power supply terminal $V_{DD}$. The output signal of the monostable multivibrator 78 is coupled to the OR gate 60, and the output signal thereof is coupled to the base of an NPN transistor 82 through a resistor 80. The emitter of the transistor 82 is grounded, and the collector thereof is connected to the base of a NPN transistor 86 through a resistor 84. The transistor 86 has its emitter connected to the power supply terminal $V_{DD}$ and its collector connected to power supply terminals of the decoder 68 and driver 70 through a voltage stabilizer 88 and a booster circuit 90.

The output signal of the aforementioned pulse generator 42 is also coupled to a timer circuit 92. The timer circuit 92 is constituted by a missing-pulse detector constructed as a 555 type integrated circuit. It serves as a delay circuit, and its output is inverted to a low level if no input pulse is supplied to it for more than a predetermined period of time. The output of the timer circuit 92 is coupled to one of the input terminals of an OR gate 94 and also to a monostable multivibrator 96. The output signal of the start circuit 76 is coupled to the other input terminal of the OR gate 94, and the output signal thereof is coupled to the base of the transistor 36, which has its collector connected to power supply terminals of the audio amplifier 12, bias circuit 18, motor control circuit 38 and power amplifier 26 as mentioned earlier. The output signal of the monostable multivibrator 96 is coupled to the bases of the transistors 30 and 34. In FIG. 1, a portion enclosed by a broken line is integrated.

The operation of this embodiment will now be described with reference to FIGS. 2A to 2G, which form a time chart showing signal waveforms appearing at various parts of the circuit of FIG. 1. It is assumed that the tape recorder is stopped although the DC voltage is supplied to the power supply terminal $V_{DD}$. In other words, it is assumed that the mode switch 46 is set to the stop terminal 48 so that the signals at the individual parts of the circuit are all at a low level. When a recording switch button is subsequently depressed, the mode switch 46 is switched to the recording terminal 50 so that the output signal therefrom is inverted to a high level as shown in FIG. 2A. Also, with the operation of the recording switch button the recording/playback select switch 14 is connected to the side of the recording terminal 16, and the magnetic head 20 is brought into contact with the magnetic tape. Since the output signal of the recording terminal 50 is coupled to the up-count terminal U of the up/down counter 44 and the OR gate 64 through the OR gate 62, the counter 44 is caused to perform the up-count, while the output signal of the OR gate 64 is inverted to a high level as shown in FIG. 2B. This output signal of the OR gate 64 causes the start circuit 76 to produce a pulse for a constant period of time as shown in FIG. 2C. In consequence, the transistor 36 is made conductive only for this period of time. Then, the supply voltage is supplied to the audio amplifier 12, bias circuit 18 and motor control circuit 38. Thus, an audio signal and a bias signal are supplied to the magnetic head 20 while a control signal for recording is supplied from the motor control circuit 38 to the motor 40, so that the audio signal is recorded on the magnetic tape. When the reel shaft is rotated with the rotation of the motor 40, a pulse signal corresponding to the rotation of the reel shaft, as shown in FIG. 2D, is generated from the pulse generator 42. This pulse signal is supplied to the counter 44 and up-counted thereby, while it is also supplied to the timer circuit 92. The timer circuit 92 produces a high level signal as shown in FIG. 2E so long as the pulse signal is supplied to it. Since the output signal of the timer circuit 92 is coupled to the base of the transistor 36 through the OR gate 94, the transistor 36 is continually made conductive even after the output signal of the start circuit 76 is inverted to a low level. The count value of the counter 44 corresponds to the amount of running of the tape, and it is stored in the memory 66.

Meanwhile, since the high level output signal from the recording terminal 50 is coupled to the base of the transistor 82 through the OR gate 60, the transistor 82 is made conductive to conduct the transistor 84, so that the collector signal from the transistor 86 is inverted to a high level as shown in FIG. 2F. This collector voltage is supplied through the voltage stabilizer 88 and booster circuit 90 to the decoder 68 and driver 70 to energize them, whereby the content of the memory 66 is displayed on the display section 72.

When the tape is completely wound on one of the reels, that is, when the tape end state is brought about, the reel shaft is no longer rotated, so that the pulse generator 42 ceases the generation of the pulse signal as shown in FIG. 2D. After the interruption of the generation of the pulse signal the output signal of the timer circuit 92 remains at a high level for a constant period of time and then it is inverted to a low level as shown in FIG. 2E. Thus, the transistor 36 is cut off to de-energize the motor control circuit 38, thus stopping the rotation of the motor 40. As a result, the tape is no longer running, so that the elongation of the tape can be prevented. At the same time, the mode select switch 46 is reset, i.e., switched to the stop terminal 48, thus rendering signals at the individual parts to be all at a low level. As a result, the head 20 is away from the tape to prevent its wear, while the display is caused to vanish.

As has been shown, with this embodiment the tape recorder is automatically stopped when the tape end state occurs, while at the same time the display section is disconnected from the power supply to prevent wasteful power consumption. Besides, there is provided a delay time until the display section is de-energized after the reel shaft is stopped, so that there occurs no such inconvenience as the vanishment of the content of the display section as soon as the tape recorder is brought to a pause.

With the falling of the output signal of the timer circuit 92 to a low level, a pulse of a constant duration or pulse width as shown in FIG. 2G is produced from the monostable multivibrator 96. This pulse width is determined by the time constant of the monostable multivibrator 96. With the appearance of this signal the transistors 34 and 30 are made conductive. As a result, the alarm circuit 32 is energized for a constant period of time, so that it supplies an alarm signal to the output terminal 28 through the power amplifier 26 during this period. This alarm signal is converted to an alarm sound by a loudspeaker, so that the operator can recognize the tape end state with the sense of hearing. This means that the operator can be released from the burden of always watching the running of the tape. The alarm sound automatically ceases when the output signal of the monostable multivibrator 96 is inverted to a low level.

What we claim is:

1. A tape recorder in which an audio signal is supplied to a magnetic head through an audio amplifier with an output signal from a bias circuit at the time of a recording operation, and an output signal from the magnetic head is supplied to a loudspeaker through the audio amplifier and a power amplifier at the time of a reproducing operation, comprising:

means for running a magnetic tape;

pulse generating means for generating a pulse signal representing a distance for which the tape travels, said pulse signal comprising spaced apart pulses;

counting means coupled to said pulse generating means for counting pulses of the pulse signal from said pulse signal generating means;

detecting means coupled to said pulse generating means for producing a detection signal, the level of which changes when the pulse interval between pulses of said pulse signal exceeds a predetermined interval;

alarm means for producing an alarm through the power amplifier to the loudspeaker;

first power supplying means coupled to said detecting means for supplying power to the audio amplifier, to the bias circuit, to the tape running means and to the power amplifier until the detecting means generates a detection signal at which time the first power supplying means is rendered off to stop supplying said power; and second power supplying means coupled to said detecting means for supplying power to the power amplifier and to the alarm means only for a predetermined period of time after the detection signal is generated.

2. The tape recorder of claim 1, wherein said second power supplying means comprises:

a monostable multivibrator for generating a signal for a predetermined period of time in accordance with a level change of the output signal from said detecting means; and switching elements coupled between a power supply terminal and said power amplifier and between the power supply terminal and said alarm means, said switching elements being further coupled to said monostable multivibrator so as to be rendered conductive responsive to the output signal from said monostable multivibrator.

* * * * *